United States Patent [19]

Hoefelmayr et al.

[11] 4,452,176
[45] Jun. 5, 1984

[54] MILK FLOW METER

[75] Inventors: Tilman Hoefelmayr, Niederteufen, Switzerland; Jakob Maier, Türkheim, Fed. Rep. of Germany

[73] Assignee: Bio-Melktechnik Hoefelmayr & Co., Niederteufen, Switzerland

[21] Appl. No.: 338,930

[22] Filed: Jan. 12, 1982

[30] Foreign Application Priority Data

Jan. 16, 1981 [DE] Fed. Rep. of Germany ........ 3101302

[51] Int. Cl.³ .............................................. A01J 7/00
[52] U.S. Cl. ............................... 119/14.17; 119/14.46
[58] Field of Search ............... 119/14.17, 14.15, 14.05, 119/14.06, 14.08, 14.46

[56] References Cited

U.S. PATENT DOCUMENTS

| 3,349,617 | 10/1967 | Hartstone | 73/202 |
| 3,496,905 | 2/1970 | Wenham | 116/117 |
| 4,229,972 | 10/1980 | Phillips et al. | 73/304 |
| 4,231,324 | 11/1980 | Schletter | 119/14.17 |

FOREIGN PATENT DOCUMENTS

| 349819 | 4/1979 | Austria . |
| 1794617 | 8/1959 | Fed. Rep. of Germany . |
| 2014438 | 2/1972 | Fed. Rep. of Germany . |
| 2334069 | 1/1975 | Fed. Rep. of Germany . |
| 2922483 | 4/1980 | Fed. Rep. of Germany . |
| 1280160 | 7/1972 | United Kingdom . |

*Primary Examiner*—Hugh R. Chamblee
*Attorney, Agent, or Firm*—Flynn, Thiel, Boutell & Tanis

[57] ABSTRACT

A milk flow meter is provided, wherein the milk is tangentially introduced into an upper milk collecting chamber communicating with a milk discharge duct via a lower measuring chamber adapted to have the filling level therein measured. The milk flow meter may be suitably employed for directly measuring the milk flow during mechanized milking. Conventional flow meters are unsuitable for this purpose due to the specific properties of the medium to be measured, namely, milk, and due to the conditions of employ. The milk flow meter described enables the milk flow accurately and continuously. It is essentially characterized in that its measuring chamber communicates with the milk discharge duct via a substantially vertically extending measuring slot shielded from the remainder of the measuring chamber by a surrounding partition provided with a flow passage adjacent its lower end, and in that means is provided for measuring the retained liquid level within the partition.

36 Claims, 8 Drawing Figures

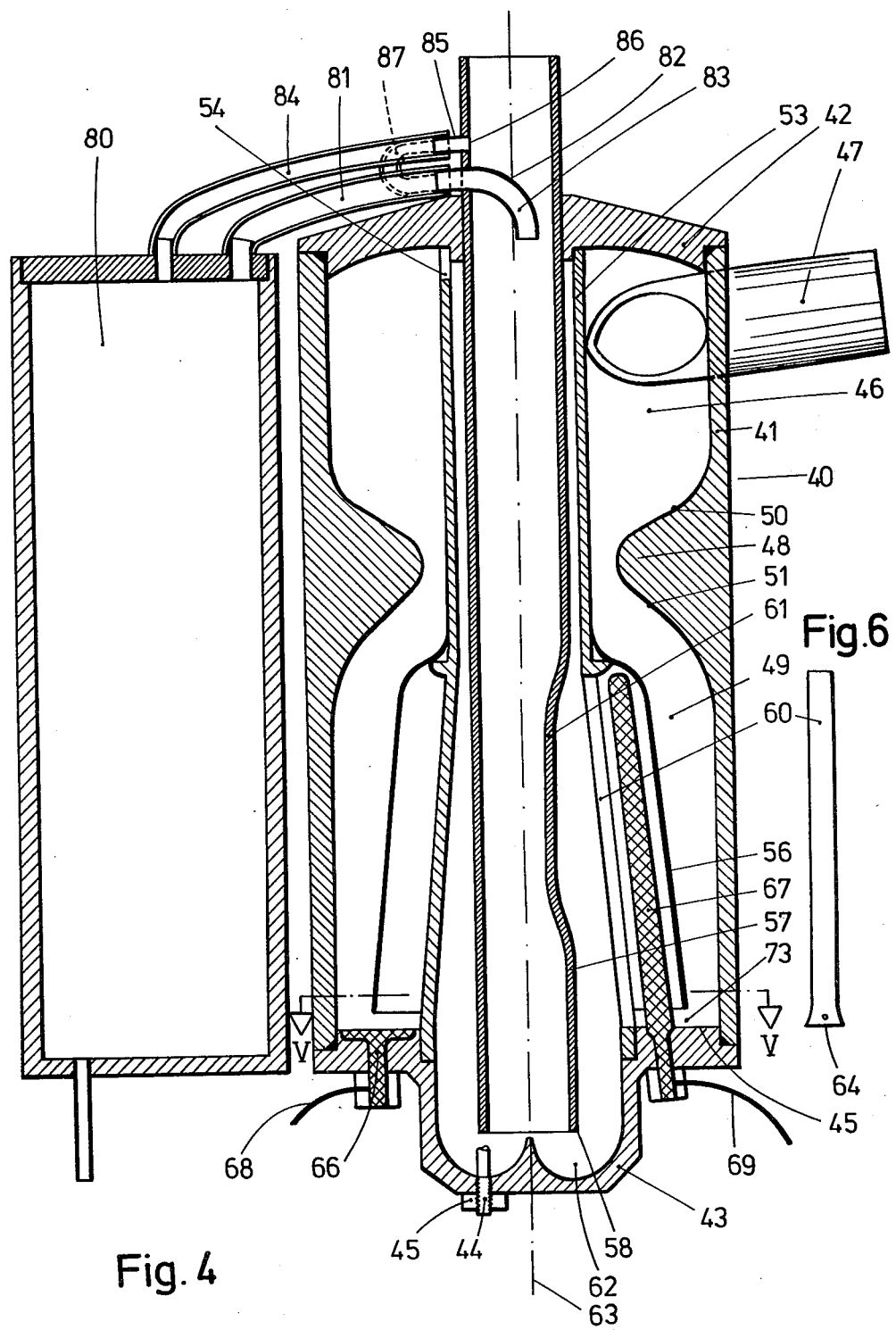

MILK FLOW METER

FIELD OF THE INVENTION

This invention relates to a milk flow meter and, more particularly, to a meter wherein the milk is tangentially introduced into an upper milk collecting chamber communicating with a milk discharge duct via a lower measuring chamber adapted to have the filling level therein measured.

BACKGROUND OF THE INVENTION

For the automation of mechanical milking, and particularly for the accurate control of the various milking parameters such as milking vacuum, pulsator vacuum, pulsator frequency and suction phase duration during the milking act or for ending the milking operation and automatic releasing of the milking equipment it is of essential importance that the milk flow be accurately measured all the time, so that control operations may be carried out in response to the momentous milk flow. It is of similar importance to accurately determine the total amount of milk obtained from the individual animal (cow, goat or ewe) in a milking act.

There are already known milk flow meters functioning on various physical principles. In the measuring of a milk flow the operating environment as well as the specific mechanical milking method result in particular conditions precluding the employ of the known flow meters. In particular, a milk flow meter should meet the following requirements:

1. The instrument should not interfere with the daily milking routine, i.e. it should be as compact as possible, lightweight and easy to handle, and in particular easy to clean, particularly in view of its employ in a chain-up stable.

2. The milk flow meter should be suitable for universal employ, i.e. it should be able to function properly in connection with overhead as well as underfloor milking lines under widely varying vacuum and pulsation conditions.

3. The measuring error, particularly with respect to the measuring of the daily total amount, should lie below 5%.

4. A milk flow meter of this type should be designed so that it can be cleaned without dismantling in the course of the daily rinsing of the milking equipment.

5. In a milk flow meter the operator-induced errors should be kept as small as possible, i.e. the device should be able to function substantially independent of its orientation, it should be of simple design and should be easy to handle.

Measuring of the milk flow has to be carried out at a location between the udder and the milk collecting line in which the milk of several animals is collected. Measuring of the milk flow is rendered relatively difficult by the fact that the milk to be measured presents itself at the measuring location in a varying and discontinuous two-phase stream. Thus the properties of the milk, for instance its viscosity, its electrical conductivity etc. vary not only from one animal to the next, but also for a single animal during a single milking act in accordance with the composition of the milk, such as its content of protein, fat or minerals. It is thus known for instance that the fat content of the milk increases towards the end of the milking act, so that the final amount has the highest fat content.

Moreover, as a substantially constant amount of atmospheric air is admitted to the milk discharge duct for aiding the flow of the milk therein, the relative air content of the milk also varies with the magnitude of the actual milk flow. Furthermore the amount of the admitted atmospheric air varies with the type of the milking equipment employed. The relative air content may also vary due to contamination or damage of the air inlet opening, so that in certain cases the amount of undesirable leaking air may be a multiple of the desired air amount. Furthermore, even if the relative air content is substantially constant, the mixing intensity between milk and air may vary widely. The mixing intensity may thus vary between a milk plug which is substantially free of air and a mixture of coarse or fine foam and microscopic air bubbles. A further difficulty in measuring the milk flow results from the fact that the milk flow pulsates more or less strongly and rather irregularly at the measuring location due to the particularities of the mechanical milking method. Further difficulties in the milk flow measuring art result from the fact that the flow velocity of the milk at the measuring location is the product of several variable factors such as the momentous vacuum magnitude, the flow amount, the outer and inner friction of the milk or the conveyance level. Finally, the flow measurement has to be carried out under milking vacuum conditions without disturbing the vacuum.

Already known from German Offenlegungs Schrifts Nos. 28 10 376 and 28 39 101 are milk amount measuring devices, wherein the milk is tangentially introduced into an upper milk collecting chamber located above a measuring chamber communicating with a milk discharge duct at its lower end. By periodically opening a flow connection between the collecting chamber and the measuring chamber and simultaneously closing the discharge duct, milk is periodically introduced from the collecting chamber into the measuring chamber, wherein the filling height is measured by means of a float arrangement, whereupon the flow connection between the collecting chamber and the measuring chamber is closed and the discharge duct is opened to discharge the previously measured amount. If this device assumes an inclined position, there is the danger of the movable parts getting jammed. The measuring accuracy of the device depends largely on its deviation from the vertical orientation. Moreover, the measurements can only be taken at certain intervals, i.e. a continuous measurement of the milk flow is not possible.

The institute for agricultural technology at the technical university of München-Weihenstephan has developed a ring electrode milk flow meter wherein the milk flows through a vertically oriented tube, the upper end of which is enlarged to form a milk collecting chamber whereinto the milk is introduced in a tangential direction. The lower cylindrical portion of the measuring tube contains two spaced annular electrodes between which the electrical resistance of the milk body actually extending between the two electrodes is measured. Measuring of the milk flow on the basis of its electric conductivity offers severe problems, however. Thus the conductivity of the milk varies with the relative air content, the composition, i.e. the relative protein, fat and anorganic matter content of the milk or even with the temperature of the milk. Furthermore the flow velocity within the measuring tube depends on the flow amount, so that measuring of the milk amount is not without problems. In addition, it is scarcely possible to obtain accurate measurements in the lower flow range (less than 1 l/min), if the device is designed for a maximum flow of about 6 l/min, this being the minimum requirement for a modern high-production cow.

Known from U.S. Pat. No. 4,122,718 is a device for measuring the liquid level in a liquid contained in a container. Two electrodes embedded in a plastics material are dipped into the container, the filling level of which is to be measured. An AC voltage applied to the electrodes is employed for measuring the capacitance between the two electrodes, which varies with the filling level of the container.

Known from U.S. Pat. No. 4,173,892 is a similar device for measuring the total amount of milk obtained from a single animal in one milking act. In this device, the milk flows into a collecting vessel having two electrodes located opposite one another on its inner and outer surfaces. The capacity between the two electrodes is measured with the aid of an AC voltage and varies with the filling level of the vessel. This known device only permits the total milk amount obtained in one milking act to be measured. The accuracy of the measurement is considerably affected by the foam floating on the surface of the milk.

It is an object of the present invention to devise a milk flow meter permitting the flow of milk to be measured continuously and as accurately as possible.

SUMMARY OF THE INVENTION

In a milk flow meter of the type set forth in the introduction this object is attained by providing that the measuring chamber communicates with the milk discharge duct via a substantially vertically extending measuring slot, that the measuring slot is shielded from the remainder of the measuring chamber by a partition surrounding said measuring slot and having a flow port adjacent its lower end, and that means is provided for measuring the level of liquid retained within said partition.

The introduction of the milk into the space surrounded by the partition from below, i.e. through the mentioned flow port, ensures that the milk within of the partition is substantially free of kinetic energy and foam, so that the amount of milk flowing off through the measuring slot may be accurately determined by measuring the level of the retained liquid, as by measuring the resistance of a heated wire instrument or by a capacity measuring method, as the main error sources such as foam and surface waves are excluded. As the milk enters the space surrounded by the partition only from below through the flow port or, if the partition is in the form of a diving bell, through a narrow gap between the lower edge of the diving bell and the bottom of the measuring chamber, and as the milk comes to rest already within the measuring chamber outside of the partition or the diving bell, respectively, its rotation energy will already be dissipated, and the entrained air will already have been separated from the milk during the extended dwelling time thereof in the collecting and measuring chambers prior to the milk's entry into the space upstream of the measuring slot. Any foam floating on the milk's surface within the measuring chamber is prevented from reaching the measuring slot by the partition itself. Similarly, any surface waves of the milk within the measuring chamber do not in any manner affect the level of the milk retained within the partition and the measuring thereof. The described arrangement thus results in the separation of milk and entrained air prior to the milk reaching the measuring slot, so that only the actual amount of milk is measured. Furthermore the kinetic energy is substantially completely dissipated prior to the milk entering the space within the partition, so that the measuring step can be carried out in a substantially completely quiescent zone devoid of surface waves and foam or air bubbles. This permits the milk flow to be accurately determined solely by measuring the level of the milk retained within the partition.

The fact that the milk flows through a measuring slot whereat the actual flow measuring step takes place offers the advantage that a modification of the flow characteristic may be obtained by suitably designing the slot, such as by varying its width along its height. If s is the width of the slot, h the retained liquid level, y the effective height of the slot, v the flow amount, and g the force of gravity, the flow amount can be determined by the formula $$v = \int_o^h \sqrt{2g(h-y)} \cdot s(y) \cdot d(y) \qquad (1)$$

If the width of the measuring slot is constant, the flow amount is determined by the formula $$v = \tfrac{2}{3} \cdot \sqrt{2g} \cdot s \cdot h^{3/2} \qquad (2)$$

Although the measuring slot may for instance be formed in the wall of the measuring chamber, it is preferred that the milk discharge duct is connected to a tube projecting into the measuring chamber and having the measuring slot formed therein. If in this case the partition is formed as a diving bell surrounding the tube, there results a relatively large volume below or within the diving bell containing substantially completely quiescent milk. The quieting effect is further improved if the space below the diving bell is accessible only via a flow opening located at the side facing away from the measuring slot.

In order to reduce as far as possible the effects of the milk flow meter on the vacuum applied to the teat cups, it is preferred that the tube projects upwards into the milk collecting chamber and has an air bypass opening at its upper end. In this manner a bypass is formed between the milk collecting chamber and the milk discharge duct, such bypass at the same time serving to conduct the air separated from the milk around the measuring location.

The level of the retained milk may for instance be determined by measuring the resistance of a heated wire located at a short distance upstream of the measuring slot and parallel thereto. Due to the considerably higher thermal and electrical conductivity of the milk as compared to the respective properties of air the resistance of the heated wire varies to a very accurately measurable degree with variations of the retained liquid level. The measurement can be rendered even more accurate by continuously monitoring the temperatures of milk and air.

Preferably, however, the retained milk level is determined by capacitive measuring by means of at least two electrodes located within the measuring chamber. For rendering the measurement of the flow amount substantially independent of the inclination of the flow meter with respect to the vertical, one of the electrodes is preferably located on the bottom of the measuring chamber, so that it is covered with milk in any inclined position of the flow meter assumed in operation, while the other electrode is formed as an electrode rod located at a short distance upstream of the measuring slot and parallel thereto.

The electrodes themselves are preferably coated with a water and fat repellent synthetic material such as poly tetra fluoro ethylene or paraffin. A coating of this kind prevents the electrodes from being wetted by the liquid above the actual retained liquid level, as such wetting would tend to simulate a larger active electrode surface and thus a higher liquid level than would actually be the case. This is of particular importance with a view to a slight surface waviness of the milk within the partition, as in this case the coating ensures that only the electrode surface corresponding to the actual liquid level is wetted during rapid level variations.

A considerably improved quieting of the milk is achieved within the measuring chamber by locating the milk collecting chamber above the measuring chamber and in communication therewith via a flow passage formed by a restriction between the two chambers. In a particularly advantageous configuration of this type, the interior wall of the milk collecting chamber as well as that of the measuring chamber are of rotation-symmetric shape, with the interior wall of the milk collecting chamber converging downwards in the direction of the flow passage, while the interior wall of the measuring chamber has its upper portion diverging downwards from the flow passage. In this case it has been found particularly advantageous to design the lower portion of the interior wall of the milk collecting chamber and the upper portion of the interior wall of the measuring chamber in the shape of a paraboloid surface. The tangential introduction of the milk into the collecting chamber imparts a rotary motion to the milk, resulting in a rapid separation of milk and air due to centrifugal and centripetal forces. The restriction between the collecting chamber and the measuring chamber together with the particular configuration of the interior wall surfaces additionally ensures that even in the case of small flow amounts leading to a reduced rotary motion the dwelling time of the milk within the collecting chamber is sufficient to achieve a substantial separation of milk and air. The dwelling time of the milk in the collecting chamber is preferably increased to such a degree that even in the case of smaller flow amounts the milk of the preceding milking pulse is still present in the collecting chamber as the milk of the succeeding milking pulse is introduced thereinto, whereby on the one hand the rotary movement of the milk of the preceeding pulse is enhanced, while on the other hand the peak of the succeeding milking pulse is levelled, resulting in a more uniform milk flow. The rotary movement of the milk in the collecting chamber thus cooperates with the restriction between the collecting chamber and the measuring chamber to promote the separation of milk and air. At the same time the dwelling time of the milk in the collecting chamber is extended, resulting in a more uniform milk flow.

The downwards diverging upper portion of the interior wall of the measuring chamber is effective to substantially reduce or arrest any rotary movement of the milk after it has passed through the flow passage between the collecting chamber and the measuring chamber. Reducing or arresting the rotary movement of the milk passing from the collecting chamber to the measuring chamber should never by carried out by means of obstacles extending transversely of the flow direction of the milk. This is because the turbulences generated by such obstacles would again lead to the formation of foam. Moreover, the provision of such obstacles might lead to considerable additional forces acting on the milk with the danger of butter precipitation, an increased proportion of free fatty acids and resulting cleaning problems.

For monitoring the milk flow and particularly the milk composition during various phases of the milking act it may be advantageous to provide a milk sampling container connected to a first tube projecting into the milk discharge duct and having an open end facing towards the milk flow in the manner of a pitot tube, and to a second tube opening into the milk discharge duct downstream of the point of insertion of the first tube. In order to enable a truly representative sample to be drawn from the milk flow, sampling is preferably carried out in a milk discharge duct in which the milk is exhausted in an upward direction, while the free opening of the first tube faces downwards into the milk flow. Likewise, the sampling tube is preferably located within the milk discharge duct with its open end at an eccentric position with respect thereto.

BRIEF DESCRIPTION OF THE DRAWINGS

Preferred embodiments of the invention shall now be discussed with reference to the accompanying drawings, wherein:

FIG. 4 shows a longitudinal sectional view of a milk flow meter in another embodiment of the invention, FIG. 6 shows the shape of a measuring slot as seen from in front.

DETAILED DESCRIPTION

Figure 1:
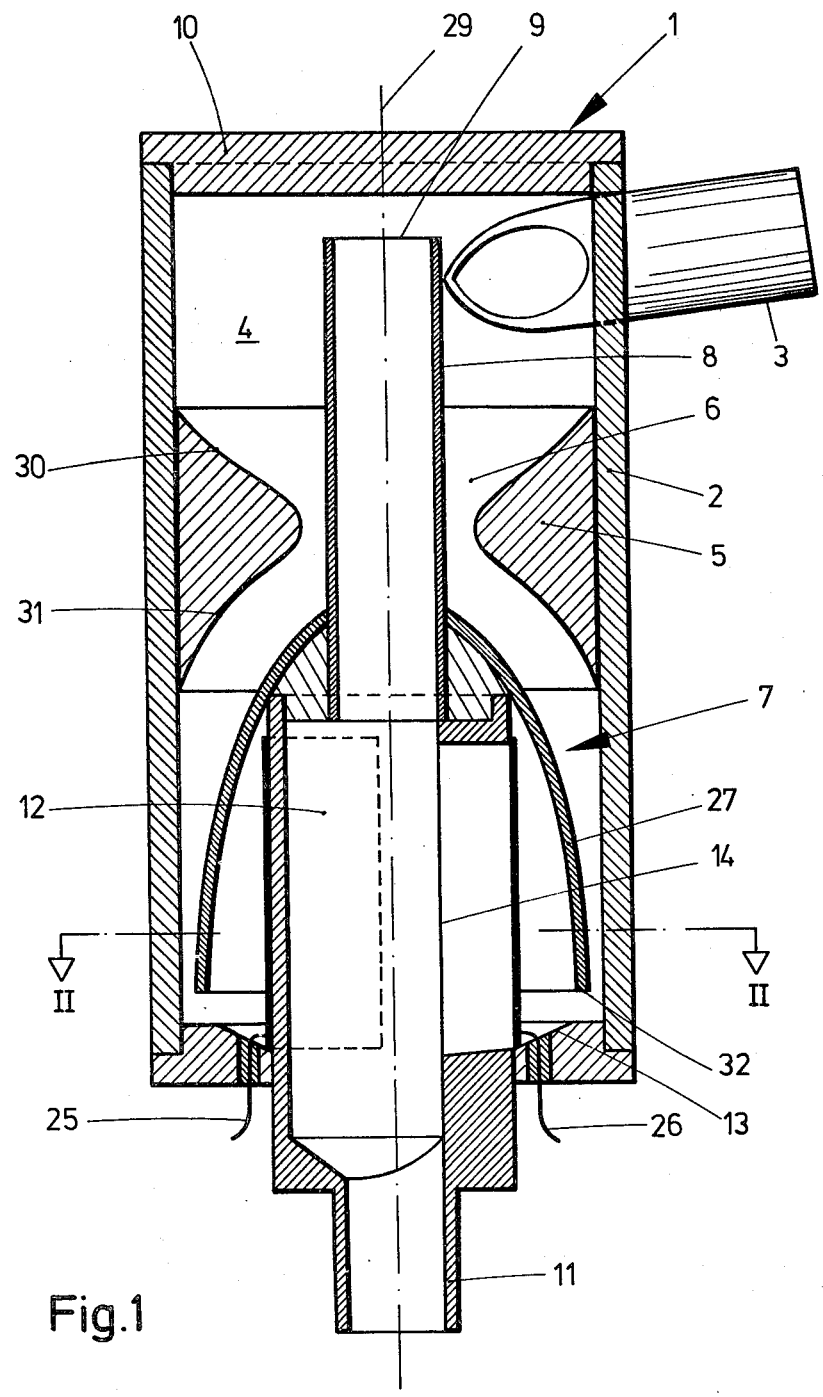
FIG. 1 shows a longitudinal sectional view of a milk flow meter according to one embodiment of the invention.

The milk flow meter 1 has a substantially cylindrical housing 2 provided with a milk supply tube 3 opening into a milk collecting chamber 4 in a tangential direction. The lower portion of collecting chamber 4 is defined by a restriction 5 surrounding a flow passage 6 connecting collecting chamber 4 with a measuring chamber 7 located therebelow. A tube 8 projecting into housing 2 from below and coaxially therewith extends upwards through measuring chamber 7 and through a major portion of collecting chamber 4, with its open upper end 9 disposed a short distance below the upper lid 10 of housing 2. The lower end 11 of tube 8 is adapted to be connected to a milk discharge duct (not shown).

Figure 2:
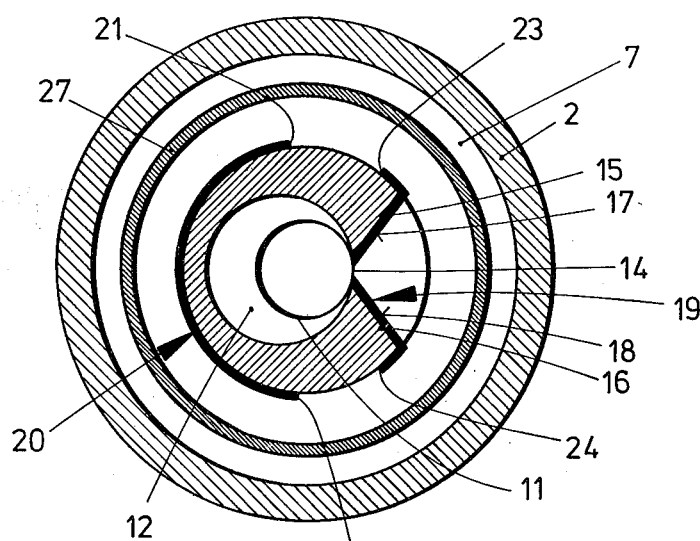
FIG. 2 shows a sectional view along the line II—II in FIG. 1.

Along a portion of tube 8 extending through measuring chamber 7, tube 8 is formed with an increased diameter section 12, the cross-sectional area of which is larger than that of tube 3. Formed in the outer wall of tube section 12 is a measuring slot 14 extending parallel to the longitudinal axis of this tube section down to the bottom 13 of measuring chamber 7. As best shown in FIG. 2, measuring slot 14 is defined by a pair of wall portions 15 and 16 diverging outwards into measuring chamber 7. Wall portions 15, 16 carry metal coatings or adhesively attached metal strips 17 and 18, respectively, forming a single electrode generally designated 19. At its side facing away from measuring slot 14, tube section 12 carries a ground electrode 20 preferably also extending along a length corresponding to that of measuring slot 14 over the lateral side of tube section 12 down to the bottom 13 of measuring chamber 7. The spacing between the longitudinal edges 21, 22 of ground electrode 20 and the longitudinal edges 23, 24 of measuring electrode 19 is selected so as to prevent the flow of an electric current between these edges along the surface of tube section 12. The measuring electrode 19 as well as the ground electrode 20 are coated with a thin layer of synthetic material. This material has to be milk and fat repellent, so that the milk does not climb upward on the coating and fat and milk residues doe not adhere thereto. Furthermore, the coating has to be impermeable to gasses in order to avoid electrolytic decomposition of the milk and corrosion of the electrodes. A coating of polytetrafluoroethylene (teflon) or paraffin has been found particularly suitable.

Each of the measuring electrode 19 and the ground electrode 20 is connected to an insulated terminal 25, 26 extending outwards through housing 2.

A short distance below flow passage 6 tube 8 carries a coaxially surrounding partition in the shape of a diving bell 27 extending downward to within a short distance from bottom 13 of measuring chamber 7. The outer surface of diving bell 27 is preferably in the form of a parabola rotated about the longitudinal axis of tube 8, i.e in the shape of a paraboloid surface. In the embodiment shown, the lower edge of the diving bell extends at a constant spacing from bottom 13. Preferably, however, this spacing is selected such that it is substantially smaller in front of the measuring slot than along the side facing away from the measuring slot. In any case, however, the spacing should be large enough to ensure thorough cleaning of the device by a rinsing method.

In a not shown modification, the lower edge of the diving bell may be lowered beyond the lower end of the measuring slot, if the bottom of the measuring chamber is lowered accordingly. This permits the milk to attain a fully quiescent state upstream of the measuring slot. On the other hand, this modification requires a small amount of milk to collect on the bottom of the chamber before the milk starts to flow through the measuring slot.

The interior wall of collecting chamber 4 has its lower portion formed as a downwards converging paraboloid surface 30 surrounding the longitudinal axis 29 of housing 2 leading over into flow passage 6, itself leading over to an upper rotation-symmetric portion 31 of the interior wall of measuring chamber 7. Portion 31 of the interior wall of measuring chamber 7 is preferably also formed as a downwards diverging paraboloid surface coaxially surrounding housing axis 29. The lower portion 30 of the interior wall of collecting chamber 4 and the upper portion 31 of the interior wall of measuring chamber 7 together define restriction 5 at the narrowest point of which collecting chamber 4 is in direct communication with measuring chamber 7 via flow passage 6.

The above described milk flow meter operates as follows: The milk flow meter may be mounted at any location, for instance between a teat cup and a collecting piece (if the milk flow from only a single teat is to be measured), or between the collecting piece and a milk collecting line or a milk collecting tank. Depending on the location of the device, the milk is intermittently introduced via supply tube 3 in accordance with the rhythm of the pulsator unit. as the supply tube 3 opens tangentially into collecting chamber 4, optionally at an angle of about 0° to 25°, preferably between 10° and 20° with respect to the horizontal, the milk is caused to rotate along the interior wall of collecting chamber 4. This gives rise to centrifugal and centripetal forces, whereby a major amount of entrained air is separated from the milk. The configuration of surface portion 30 is effective to extend the dwelling time of the milk in collecting chamber 4, so that the separation of milk and air is substantially completed within this chamber even in the case of very small flow amounts. Extension of the dwelling time also results in the milk of at least two milking pulses being collected within the collecting chamber, so that a substantially uniform milk flow is achieved. Restriction 5 results in the rotation of the milk accelerating along its downward flow path towards passage 6. Subsequently, the downward diverging interior wall portion 31 of measuring chamber 7 is effective to reduce the rotary movement of the milk to such a degree that the milk has practically lost all of its kinetic energy on reaching bottom 13 of chamber 7. The milk then flows through the gap between the lower edge 32 of diving bell 27 and bottom 13 into the space below the diving bell, in which it rises to a level determined by the actual flow amount. From there the milk flows through measuring slot 14, which in the embodiment shown is of constant width over its full length, into enlarged section 12 of tube 8, to be evacuated therefrom by the milking vacuum applied to lower end 11. The open upper end 9 of tube 8 permits the air to flow separately from the milk from collecting chamber 4 to the discharge duct and ensures that the milking vacuum is transmitted to supply tube 3 with as little disturbance as possible.

The milk flow amount is determined in accordance with the above stated formula (1) by measuring the level of the milk retained at slot 14. In the embodiment shown, the two electrodes 19 and 20 are employed for a capacitive measuring method.

Figure 3:
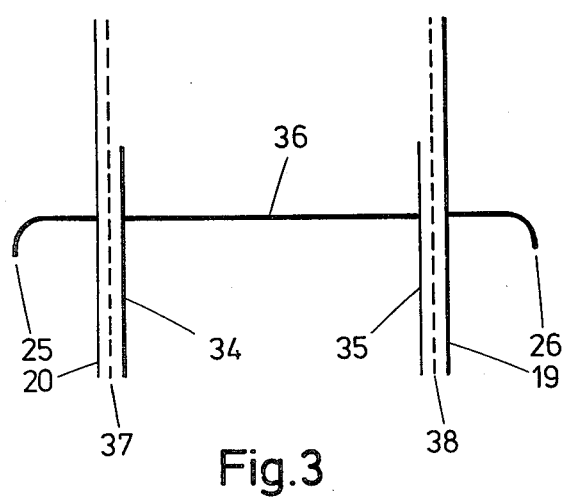
FIG. 3 shows a circuit diagram of capacity measuring electrodes.

FIG. 3 shows in diagrammatic form the connection of measuring electrode 19 with its terminal 26 and of ground electrode 20 with its terminal 25. Both electrodes 19 and 20 are coated with a thin layer 37 and 38, respectively, of a synthetic material. The outer surfaces of layers 37 and 38 are wetted by the medium to be measured, i.e. milk 36, up to the retained liquid level, i.e. along surface portions of identical height designated 34 and 35, respectively, in FIG. 3. The two surface portions 34 and 35 are electrically interconnected by the milk 36 which has a very high conductivity of about 45 to 75 $\mu$s/m, so that they may be considered as being short-circuited by the medium 36 to be measured. The circuit arrangement is thus in effect constituted by a pair of series-connected capacitors the dielectric medium of which is formed by the insulating layers 37 and 38 on electrodes 19 and 20, respectively. The thickness of layers 37 and 38 thus practically determines the thickness of the capacitors, with the result that the thickness of the insulating layers is of very high importance with regard to measuring errors. It is therefore essential that the insulating layers are of essentially uniform thickness. The variation $\Delta C$ of the capacity of this circuit arrangement is directly proportional to the variation of the sum of the wetted surfaces 34 and 35. (Milk foam and a wetting of the electrodes beyond the retained liquid level would be sensed as an increase of the liquid level.) The variation of these surfaces is again directly proportional to the variation $\angle h$ of the retained liquid level. Variations of the retained liquid level may thus be measured directly as variations of the capacity of the circuit arrangement described.

The variations of the capacitry can be measured by means of any known circuit arrangement. A preferred circuit arrangement is described in German Auslegeschrift No. 1,121,824, wherein an AC voltage is applied to a voltage divider formed of a measuring resistor and the capacity to be measured, and the AC voltage reduced by the measuring resistor is rectified and measured.

A suitable circuit arrangement may for instance comprise an oscillator having a triangular output waveform for generating the required AC voltage. The measuring section, i.e. the electrodes 19, 20 cause a voltage drop to occur at the measuring resistor. In a following wide band operation amplifier the measuring voltage is then amplified by the factor 100, rectified by means of an active rectifier of high linearity, and levelled by means of an RC circuit. Through an impedance converter the signal is then supplied to a filter also acting as a value detector for compensating waves and bubbles occurring adjacent the electrodes. The value detector bridges the time gap required for liquid wetting the electrodes to flow off. The electric peak signals resulting from rapid variations of the retained liquid level due to a remaining surface waviness are evaluated by the value detector at a reduced proportion, preferably at about a third of the value. The output for the milk flow signal is then formed by an operation amplifier for post-calibration with an amplification factor of 1 to 1.5.

If it is desired to determine not only the milk flow, but also the overall amount of milk, the milk flow signal is digitalized and subsequently summed, so that the total milk amount can be displayed directly.

Figure 5:
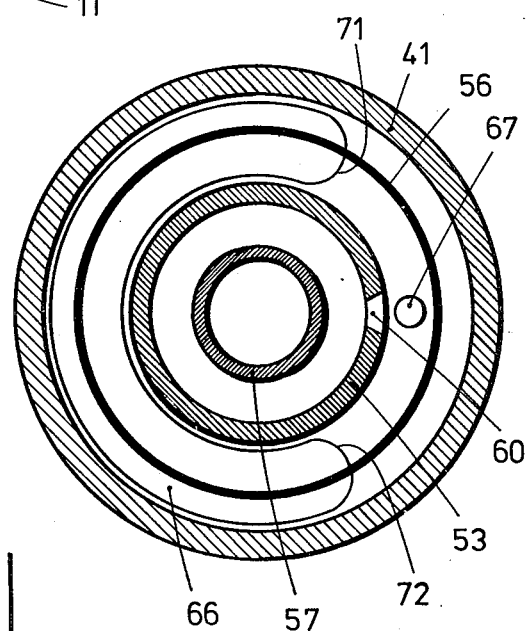
FIG. 5 shows a sectional view along the line V—V in FIG. 4.

A milk flow meter 40 shown in FIGS. 4 to 6 is basically similar to the one shown in FIG. 1, for which reason the following description is mainly directed to the differing features thereof. Flow meter 40 also comprises a cylindrical housing 41 closed at its ends by end covers 42 and 43 held together by means of three tension bolts 44 and nuts 45 (only one of which is shown) extending substantially parallel to the longitudinal axis of housing 41. A milk supply duct 47 opens tangentially into milk collecting chamber 46. Collecting chamber 46 communicates with a measuring chamber 49 via a restriction 48. Restriction 48 is formed by a downwards converging lower wall portion 50 of collecting chamber 46 and a downwards diverging upper wall portion 51 of measuring chamber 49. A tube 53 communicating with collecting chamber 46 via a port 54 adjacent its upper end extends through the full length of the collecting chamber and through measuring chamber 49 to a point above the bottom of the measuring chamber. Starting from the point of attachment of a diving bell 56, the diameter of tube 53 increases downwards to its lower end. A milk discharge tube 57 is coaxially located within tube 53. The lower end 58 of discharge tube 57 extends to a point below the lower end of a measuring slot 60 formed in the wall of tube 53 lengthwise thereof. Opposite measuring slot 60, discharge tube 57 has a recessed wall portion 61 so as not to impede the flow of milk through measuring slot 60 into tube 53.

In order to provide a flow-dynamically smooth transition from the lower end of tube 53 to milk discharge duct 57 and to facilitate cleaning of the milk flow meter by simply flowing a cleaning fluid therethrough, the interior wall surface 62 of cover 43 is formed by rotating the lower half of a circular arc having the longitudinal center axis 63 of milk discharge duct 57 as a tangent about said center axis 63. The lower end of the otherwise closed tube 53 should be as small as possible, so that residual liquid remaining therein after use can be exhausted therefrom by admitting a short air pulse while the milking vacuum is still in effect.

The shape of measuring slot 60 is best seen in FIG. 6. In order to achieve a favourable and simple relation between the milk flow amount and the retained liquid level, slot 60 is formed as a longitudinal slot extending parallel to the longitudinal axis of tube 53. Preferably, however, slot 60 is of gradually decreasing width from its lower end to its upper end. Thus slot 60 may have an overall length of about 65 mm, with its width decreasing from about 4.5 mm at the lower end to about 4.2 mm at the upper end. In addition it has been found advantageous to increase the width of slot 60 over a height of about 5 mm adjacent its lower end in such a manner that its lower end wall 64 has a width of 6 mm.

As shown particularly in FIG. 5, the ground electrode 66 is formed as a substantially C-shaped electrode embedded in the bottom 45 of the measuring chamber. This offers the advantage that in operation of the flow meter the ground electrode is always covered by the liquid, e.g. milk, whereby the circuit diagram of FIG. 3 is modified in such a manner that surface portion 35 is always constant independent of the retained liquid level. Accordingly the capacity between surfaces 19 and 35 does not vary, so that this portion of the series-connected circuit may be considered substantially constant.

The measuring electrode 67 of the embodiment shown in FIGS. 4 and 5 is formed as a rod electrode located a short distance upstream of measuring slot 60 and extending parallel thereto. Rod electrode 67 projects through the bottom 45 of measuring chamber 49 into diving bell 56. Ground electrode 66 as well as measuring electrode 67 are each connected to terminals 68 and 69, respectively, extending outwards of housing 41.

Both ground electrode 66 and measuring electrode 67 are coated with a thin layer of a water and fat repellent insulating material. As in this circuit arrangement the capacity varies in response to variations of the retained liquid level only in proportion to the surface of the measuring electrode 67 covered or wetted by the milk, only the thickness of the coating on measuring electrode 67 is critical, and variations of the coating thickness result in measuring errors. Contrary thereto, the thickness of the coating layer on ground electrode 66 is not critical and may be selected different from that of the coating layer on measuring electrode 67. Slight variations of the thickness of the coating layer on measuring electrode 67 may even be permissible as long as the coating thickness as integrated circumferentially of the rod varies only slightly at each axial height.

Further it has been found advantageous to dimension the surface of the ground electrode such that it is larger than the surface of the measuring electrode, e.g. that it is preferably at least 2 to 2.5 times as large as the latter.

The measuring electrode 67 should be located as closely as possible in front of slot 60, although at a sufficient distance therefrom so that it does not interfere with the flow therethrough. This arrangement offers the advantage that the measuring result is substantially unaffected by inclination of the milk flow meter as might be expected in normal operation.

As shown in FIG. 5, the ends 72 and 74 of ground electrode 66 are located at a distance of at least 15 mm from electrode 67. This distance applies to a milk flow meter in which the housing 41 has a diameter of about 80 mm. In order to ensure unimpeded flow of the milk from measuring chamber 49 underneath the lower edge of diving bell 56 to the interior of the diving bell and through measuring slot 60, and to enable the milk to rise within diving bell 56 to the level corresponding to that in measuring chamber 49, the area of the passage 73 formed between the lower edge of diving bell 56 and the bottom 45 of measuring chamber 49 is preferably about twice as large as the area of measuring slot 60.

According to a particular feature of this embodiment, the milk flow meter shown offers the possibility to draw samples from the milk flow during milking. This is of particular interest in view of the fact that the composition of the milk varies during the milking act. There is in particular an increase of the fat content of the milk towards the end of the milking act. For drawing samples there is provided a sample container 80 communicating via a first tubing 81 with a bent sampling tube 82 having an open end 83 located within discharge tube 57 and facing towards the milk flow in the manner of a pitot tube. A second tubing 84 connects container 80 to a tubular nipple 85 having an open end 86 in communication with the interior of discharge tube 57. The drawing of milk samples should preferably be carried out in a vertically rising flow. In this case the milk-air mixture is more uniformly distributed over the cross-sectional area of the milk discharge tube, so that the drawn sample is more representative of the actually prevailing conditions. The opening 86 is preferably located downstream of and radially offset from the point at which sampling tube 82 projects into discharge tube 57. The open end 83 of sampling tube 82 is preferably located eccentrically with respect to discharge tube 57.

The introduction of samples into container 80 is facilitated by the dynamic pressure at opening 83 and the milking vacuum at opening 86. As the drawing of samples is usually carried out at considerable intervals, the end of sampling tube 82 projecting from discharge tube 57 may in the intervening periods be connected to nipple 85 by means of tube loop 87, so that the device can be readily switched over from sampling to normal operation.

Operation of the milk flow meter shown in FIGS. 4 to 6 is essentially the same as that of the above described embodiment, with the main difference, that the milk is exhausted upwards through discharge duct 57, instead of flowing downwards as in the first embodiment. Measuring of capacity variations in response to the retained liquid level as well as of the total milk amount, if desired, is carried out in the same manner as described above with respect to the first embodiment.

Figure 7:
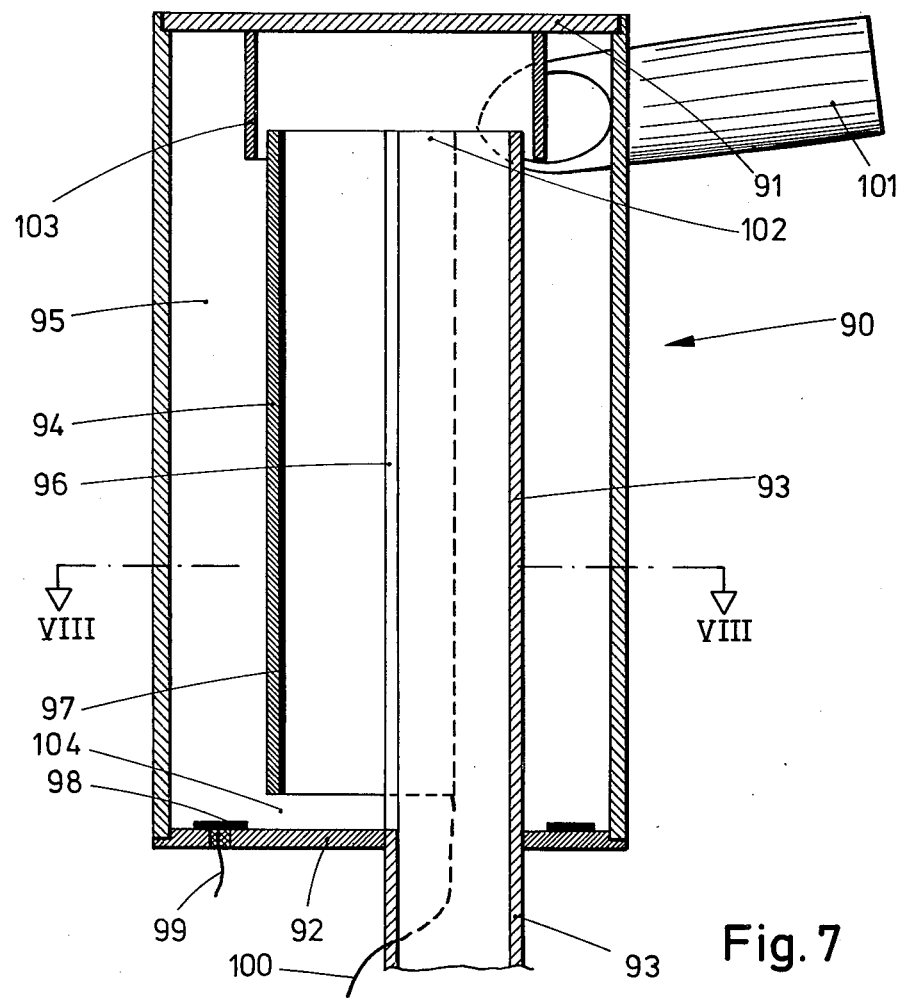
FIG. 7 shows a longitudinal section of a milk flow meter in a further embodiment of the invention.
Figure 8:
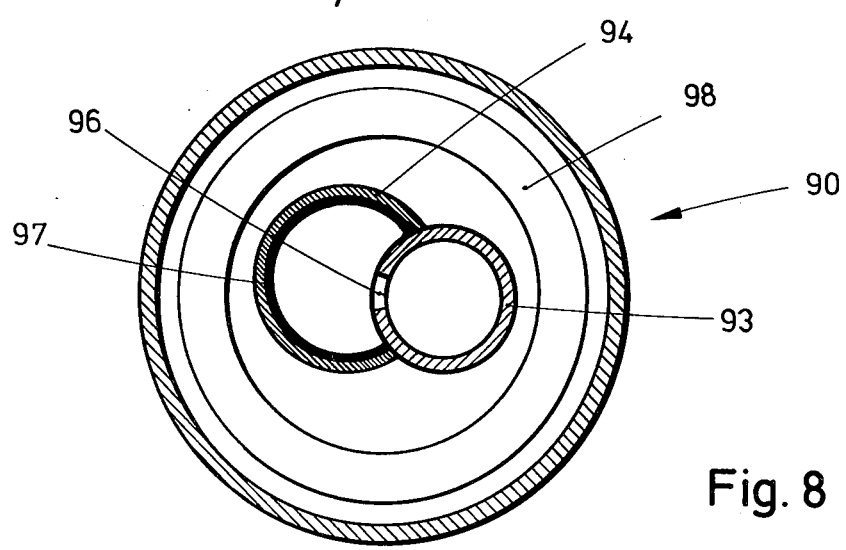
FIG. 8 shows a sectional view taken along the line VIII—VIII in FIG. 7.

FIGS. 7 and 8 show a further embodiment of a milk flow meter 90 according to the invention. Flow meter 90 also comprises a cylindrical outer housing having a diameter of about 100 to 120 mm and a height of about 100 mm. The ends of the housing are closed by an upper cover 91 and a bottom 92. A tube 93 projects through bottom 92 and is connected to a milk discharge duct (not shown). Tube 93 has an open upper end 102 a short distance below cover 91, and is formed with a measuring slot 96 extending the length thereof down to bottom 92. Measuring slot 96 is shielded from the remainder of a measuring chamber 95 by a partition 94 best shown in FIG. 8. Partition 94 surrounds measuring slot 96 in the shape of a circular arc and is connected to tube 93 in spaced relation to slot 96. The partition thus forms a tube extending parallel to tube 93 and having also an open upper end. The lower end of partition 94 is located at a certain distance above bottom 92, so that there remains a flow passage 104 leading from measuring chamber 95 to the space between partition 94 and tube 93. Attached to the interior surface of partition 94 is a measuring electrode 97. Disposed on bottom wall 92 is a ground electrode 98 in the shape of an annular surface surrounding tube 93 together with partition 94. Measuring electrode 97 and ground electrode 98 are connected to terminal leads 100 and 99, respectively, extending outwards of housing 90.

The milk is introduced into flow meter 90 via a supply duct 101 opening tangentially into the upper portion of its interior forming an integral milk collecting space and measuring chamber 95. In this embodiment there is thus no restriction between the milk collecting space and the measuring chamber. For preventing the milk introduced via supply duct 101 from directly entering the open upper end 102 of tube 93, there is provided a shielding wall 103 in the form of a ring attached to cover 91 and surrounding the upper end of tube 93 and partition 94.

In operation of the milk flow meter, milk introduced via supply duct 101 is caused by its kinetic energy to flow along a helical path along the interior wall surface of the housing down towards bottom 92. This rotary motion causes entrained air to be separated from the milk. The air so separated bypasses the measuring section itself by flowing underneath shielding wall 103 directly into the open upper end 102 of tube 93 and into the discharge duct connected thereto. The milk collected in measuring chamber 95 flows to the interior of partition 94 and thus towards measuring slot 96 only via flow passage 104. In the interior of partition 94, the milk is therefore substantially quiescent and essentially free of surface waviness and foam. The milk then flows through measuring slot 96 into tube 93. The retained liquid level within partition 94 is determined with the aid of measuring electrode 97 and ground electrode 98 by a capacitive measuring method, as already discussed above.

The invention thus provides an improved novel milk flow meter of low weight and reduced dimensions, which does therefore not interfere with the daily milking routine. Its design permits the device to be universally employed, i.e. in connection with overhead milking lines as well as with underfloor milking installations. Furthermore, the device is capable of functioning properly under any vacuum and pulsation conditions. A high measuring accuracy is readily achieved, with measuring errors reduced to as little as two or three percent. The measuring accuracy is not essentially affected by deviations of the device from its normal vertical position. Cleaning of the device offers no problems, as the device can be readily cleaned by flow-through rinsing as conventionally employed for cleaning the remainder of the milking equipment.

We claim:

1. In a milk flow meter which includes means defining a collecting chamber, means for supplying milk tangentially into said collecting chamber, means defining a measuring chamber, means providing continuous fluid communication between said collecting chamber and said measuring chamber, and a milk-discharge line communicating with said measuring chamber, the improvement comprising wherein said measuring chamber has a partition wall which, in the region of a lower end thereof, has means defining a transfer opening which provides fluid communication between first and second portions of said measuring chamber which are located on opposite sides of said partition wall, said means for providing fluid communication between said collecting and said measuring chambers being in communication with said first portion of said measuring chamber, said measuring chamber having means defining a substantially vertical measuring slot in a wall of said second portion thereof, said discharge line communicating with said second portion of said measuring chamber through said slot, and including means for measuring the level of milk in said second portion of said measuring chamber.

2. The milk flow meter according to claim 1, wherein a portion of said collecting chamber is disposed above said measuring chamber, and wherein a further portion of said collecting chamber surrounds a portion of said measuring chamber.

3. The milk flow meter according to claim 1, wherein said means defining said measuring chamber includes a tube which projects into said measuring chamber, said tube having said measuring slot formed therein and being in communication with said discharge line.

4. The milk flow meter according to claim 3, wherein said collecting chamber is located over said measuring chamber, and wherein said tube projects upwardly into said collecting chamber and has an open upper end located in said collecting chamber.

5. The milk flow meter according to claim 4, wherein said open upper end of said tube is surrounded by shield means for preventing the entry of milk thereinto.

6. The milk flow meter according to claim 3, wherein said tube has, in the region of said measuring slot, a diameter larger than that of said discharge line.

7. The milk flow meter according to claim 3, wherein said tube has a closed lower end at a location below the lower end of said measuring slot, and wherein said discharge line includes a conduit which extends downwardly into said tube and has an opening spaced a small distance above said closed lower end of said tube.

8. The milk flow meter according to claim 7, wherein, in order to avoid flow-induced and vacuum-induced losses, an inner surface of said closed lower end of said tube is defined by rotating an arc, which is the lower half of a circle, about the longitudinal center axis of said conduit in a manner so that said longitudinal center axis of said conduit is tangent to said circular arc.

9. The milk flow meter according to claim 1, wherein the width of said measuring slot decreases slightly in an upward direction.

10. The milk flow meter according to claim 1, wherein said measuring slot has a portion adjacent its lower end which is of greater width than the remainder of said measuring slot.

11. The milk flow meter according to claim 1, wherein said means for measuring the level of milk in said second portion of said measuring chamber includes a heated wire provided in said second portion of said measuring chamber at a location spaced from said measuring slot and extending generally parallel thereto.

12. The milk flow meter according to claim 1, wherein said means for measuring the level of milk in said second portion of said measuring chamber includes first and second electrodes provided in said second portion of said measuring chamber and means cooperable with said electrodes for measuring a capacitance between said electrodes which is proportional to the level of milk in said second portion of said measuring chamber.

13. The milk flow meter according to claim 12, wherein said first electrode is completely covered by the milk in said second portion of said measuring chamber during measuring of said capacitance, and wherein said second electrode extends approximately vertically over at least the length of said measuring slot.

14. The milk flow meter according to claim 13, wherein said second electrode is a strip provided on a surface of said measuring chamber and extends along said measuring slot on one side thereof.

15. The milk flow meter according to claim 13, wherein said second electrode is a rod which is spaced from and extends generally parallel to said measuring slot at a location upstream thereof.

16. The milk flow meter according to claim 12, wherein the exposed surface of each said electrode is coated with a thin layer of a moisture-repellent synthetic material.

17. The milk flow meter according to claim 16, wherein said synthetic material is one of a polyfluoroethylene and paraffin.

18. The milk flow meter according to claim 16, wherein said coating on each said electrode is of uniform thickness.

19. The milk flow meter according to claim 13, wherein said first electrode is provided at the bottom of said measuring chamber.

20. The milk flow meter according to claim 13, wherein the surface areas of said first and second electrodes which are effective for measuring said capacitance are selected so that the effective surface area of said first electrode is larger than that of said second electrode.

21. The milk flow meter according to claim 20, wherein the ratio of the effective surface area of said first electrode with respect to that of said second electrode is at least 2:1.

22. The milk flow meter according to claim 1, wherein said means for measuring the level of milk in said second portion of said measuring chamber includes value detector means for under-proportionally evaluating instantaneous peaks in the measured level of the milk, including peaks caused by surface waves of the milk.

23. The milk flow meter according to claim 1, wherein said partition wall has approximately the shape of a bell, and wherein said transfer opening is defined by a space provided between a lower edge of said partition wall and a bottom surface of said measuring chamber.

24. The milk flow meter according to claim 1, wherein the cross-sectional area of said transfer opening is approximately twice as large as that of said measuring slot.

25. The milk flow meter according to claim 1, wherein said collecting chamber is located above said measuring chamber and said means for providing fluid communication therebetween includes a passageway which extends therebetween and has means defining a restriction therein.

26. The milk flow meter according to claim 25, wherein an inner surface of said collecting chamber is rotationally symmetric and said means defining said restriction includes a lower portion of said inner surface tapering downwardly and inwardly toward said passageway.

27. The milk flow meter according to claim 25, wherein an inner surface of said first portion of said measuring chamber is rotationally symmetric and said means defining said restriction includes an upper portion of said inner surface tapering upwardly and inwardly toward said passageway.

28. The milk flow meter according to claim 25, wherein at least one of a lower portion of an interior surface of said collecting chamber and an upper portion of an interior surface of said measuring chamber has approximately the shape of a paraboloid.

29. The milk flow meter according to claim 23, wherein an outer surface of said partition wall has approximately the shape of a paraboloid.

30. The milk flow meter according to claim 29, wherein said collecting chamber is located above said measuring chamber and said means for providing fluid communication therebetween includes a passageway which extends therebetween, and wherein the axis of said outer surface of said partition wall is coaxial with a longitudinal axis of said passageway.

31. The milk flow meter according to claim 1, wherein said means for supplying milk to said collecting chamber includes a milk supply tube opening tangentially into said milk collecting chamber and inclined upwardly away from said collecting chamber at an angle in the range of about 10° to 20° with respect to a horizontal line.

32. The milk flow meter according to claim 1, including a milk sampling container which communicates with a first tube which extends into said discharge line and has an open end facing opposite to the direction of milk flow in said discharge line, said sampling container also communicating with a second tube which communicates with said discharge line at a location therein downstream of said first tube.

33. The milk flow meter according to claim 32, wherein said discharge line is arranged so that milk is drawn therethrough by suction in a generally upward direction, said open end of said first tube facing downwardly.

34. The milk flow meter according to claim 32, wherein said open end of said first tube is positioned eccentrically in said discharge line with respect to the longitudinal axis of said discharge line.

35. A milk flow meter, comprising means defining first and second chambers, said first chamber having a generally circular horizontal cross section; means for supplying milk to said first chamber in a generally tangential direction; means providing continuous fluid communication between said first chamber and a lower portion of said second chamber; means defining an approximately vertical measuring slot in a wall of said second chamber; a discharge conduit which is in fluid communication with said second chamber through said measuring slot; and means for measuring the level of milk in said second chamber, including two electrodes provided in said second chamber, one of said electrodes extending generally vertically from a location below the minimum level of milk to be measured to a location above the maximum level of milk to be measured, and including means electrically coupled to said electrodes for measuring a capacitance which varies in proportion to the level of milk in said second chamber.

36. A milk flow meter, comprising means defining first and second chambers, said first chamber having a generally circular horizontal cross section; means for supplying milk to said first chamber in a generally tangential direction; means providing continuous fluid communication between said first chamber and a lower portion of said second chamber; means defining an approximately vertical measuring slot in a wall of said second chamber; a discharge conduit which is in fluid communication with said second chamber through said measuring slot; and electric sensing means for measuring the level of milk in said second chamber.

* * * * *